Aug. 26, 1958 J. E. OSTLINE 2,849,536

MEASURED SERVICE CONTROL APPARATUS

Filed June 13, 1955 2 Sheets-Sheet 1

INVENTOR.
JOHN E. OSTLINE
BY
Mc Walter Owen
ATTY.

Aug. 26, 1958

J. E. OSTLINE 2,849,536

MEASURED SERVICE CONTROL APPARATUS

Filed June 13, 1955

2 Sheets-Sheet 2

INVENTOR
JOHN E. OSTLINE
BY
Wm Walter Owen
ATTY.

2,849,536

MEASURED SERVICE CONTROL APPARATUS

John E. Ostline, Chicago, Ill., assignor to General Telephone Laboratories, Incorporated, a corporation of Delaware Application June 13, 1955, Serial No. 514,995

20 Claims. (Cl. 179—8.5)

Figure 1:
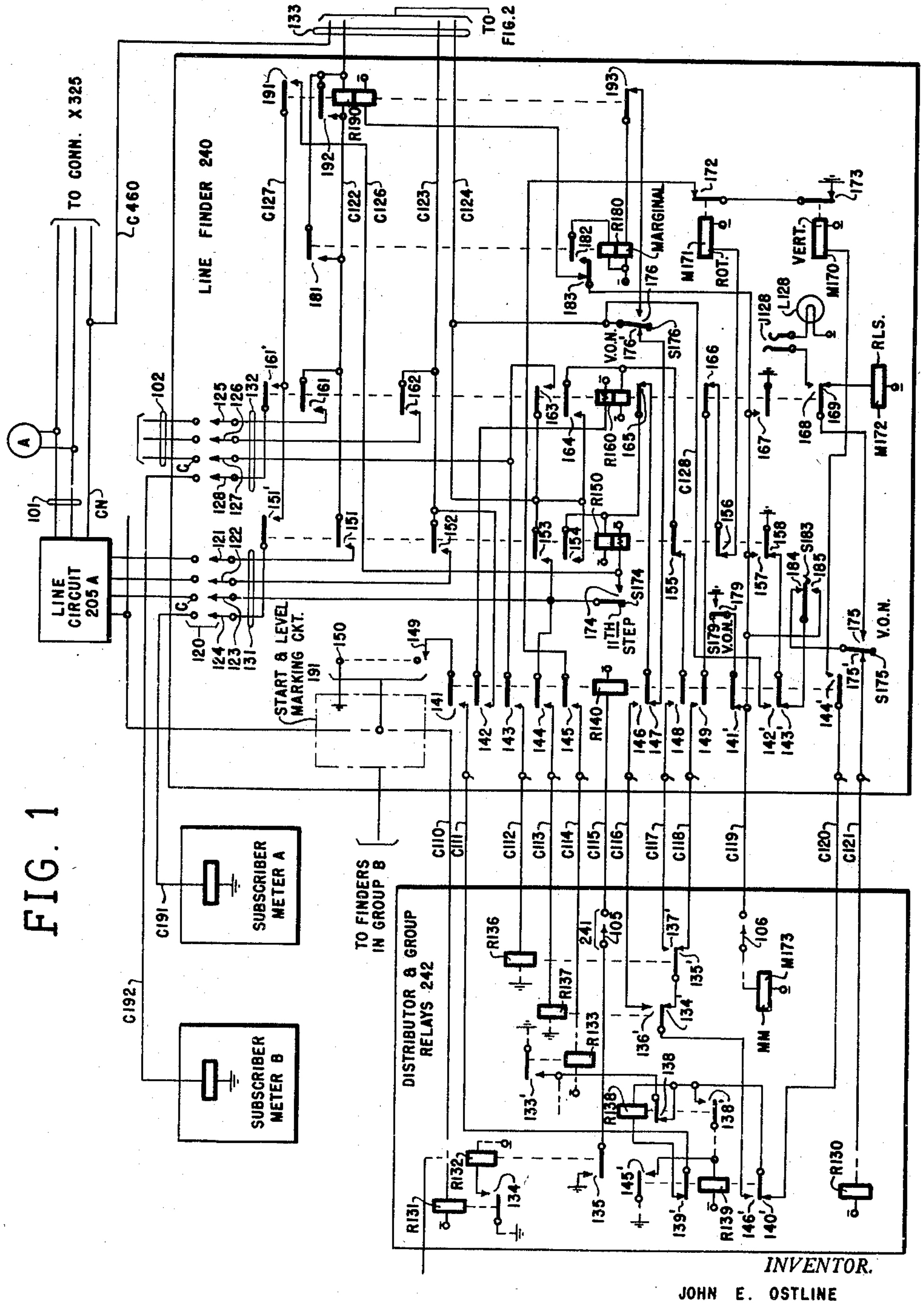

The present invention relates to automatic telephone systems of the character in which the calling subscriber line may be identified and predetermined items of information pertaining to a call in progress may be recorded. More particularly this invention relates to improvements in measured service control apparatus in linefinder switches of the character disclosed in the U. S. patent to Bakker, No. 2,289,896, granted July 14, 1942, and adapted for employment in such automatic telephone systems. One such telephone system with which the use of the present invention is contemplated is fully described in the copending application of Ivan V. Coleman, Serial No. 487,500, filed Feb. 11, 1955. The aforementioned application describes a system with which the present invention is fully compatible and for this reason liberal reference will be had to this copending application in describing the arrangement and manner of operation of the present invention.

As is well-known in the art, linefinder switches are provided in automatic telephone systems to search for a calling line when a call is initiated at a subscriber substation and, upon finding a calling line terminating in its contact bank, to seize the calling line and connect it through to an idle connector or first selector in the switch train. In a conventional telephone arrangement requiring linefinder switches each of the subscriber lines is terminated in an individual line circuit, each of the line circuits in turn terminating in the contact banks of the linefinder switches. Normally the subscriber lines ultimately so terminating on the contact banks of linefinder switches are divided into two groups, each of the groups of lines normally being served by a predetermined group of linefinder switches, the number of linefinder switches in each group being determined by the traffic to be handled in each group of lines. Each of the group of linefinder switches has associated with it, and each of the linefinders in a group is controlled by, a set of group relays and a distributor, each of the line circuits terminating a subscriber line within a particular group of subscriber lines also being connected to the distributor and group relays associated with that group. The distributor and group relays serve the well-known function of assigning an idle linefinder switch within its associated group of linefinder switches to search for the calling subscriber line. With each linefinder switch is individually associated a connector or, as in the system with which the use of the present invention is contemplated, a selector, to form a finder-selector link.

In an automatic telephone system of the character described in the aforementioned copending Ivan V. Coleman application, local calls, that is, calls to subscriber stations within the exchange of the originating subscriber station are not handled in the manner in which calls to subscriber stations in distant exchanges are handled. In the latter case, collateral equipment associated with the originating exchange is called into service to detect and identify the calling subscriber, to register sufficient of the data pertaining to a call in progress to properly assess the call, and to record this data for billing and accounting purposes. On the other hand, calls wholly between subscriber stations within the local exchange will not require the services of this particular registering equipment nor will this particular recording equipment be utilized. However, means must be provided to register calls made by each subscriber station in a local exchange to subscriber stations also within the same local exchange. This means must further be disabled in the event a call is to be extended to a subscriber station in a distant exchange and with which the said recording equipment is employed to prevent a double registration of the call with a possibly resulting double billing.

Accordingly, it is an object of this invention to provide in an automatic telephone system adapted to make a permenent record of items of information pertaining to calls completed, a new and improved arrangement in a linefinder which will render effective means for the registration of local calls originating in the exchange within which the call is to be completed and which will disable the said local call registering means for calls to be completed to predetermined distant exchanges.

Another object of this invention is to provide in an automatic telephone system having a first toll registering means associated therewith for automatically registering and recording informational data pertaining to calls for which toll charges are to be assessed and a second local registering means for registering local calls for which no toll charges are to be assessed, an improved circuit arrangement which will render effective said second local registering means for calls completed locally within the originating exchange and which will disable said second local registering means when said first toll registering means is to be operated in connection with calls completed in distant exchanges.

It is a further object of this invention to provide a new and improved switching means for an automatic telephone system in which a detailed record of calls completed to distant exchanges is made, which switching means is effective responsive to calls for which no detailed record is to be made to connect in said system an operative registering means for registering said last mentioned calls.

Another object of the present invention is to provide in an automatic telephone system an improved linefinder switch which will connect in said system an operative registering means for registering calls originating in a local exchange and completed in the same exchange.

Figure 2:
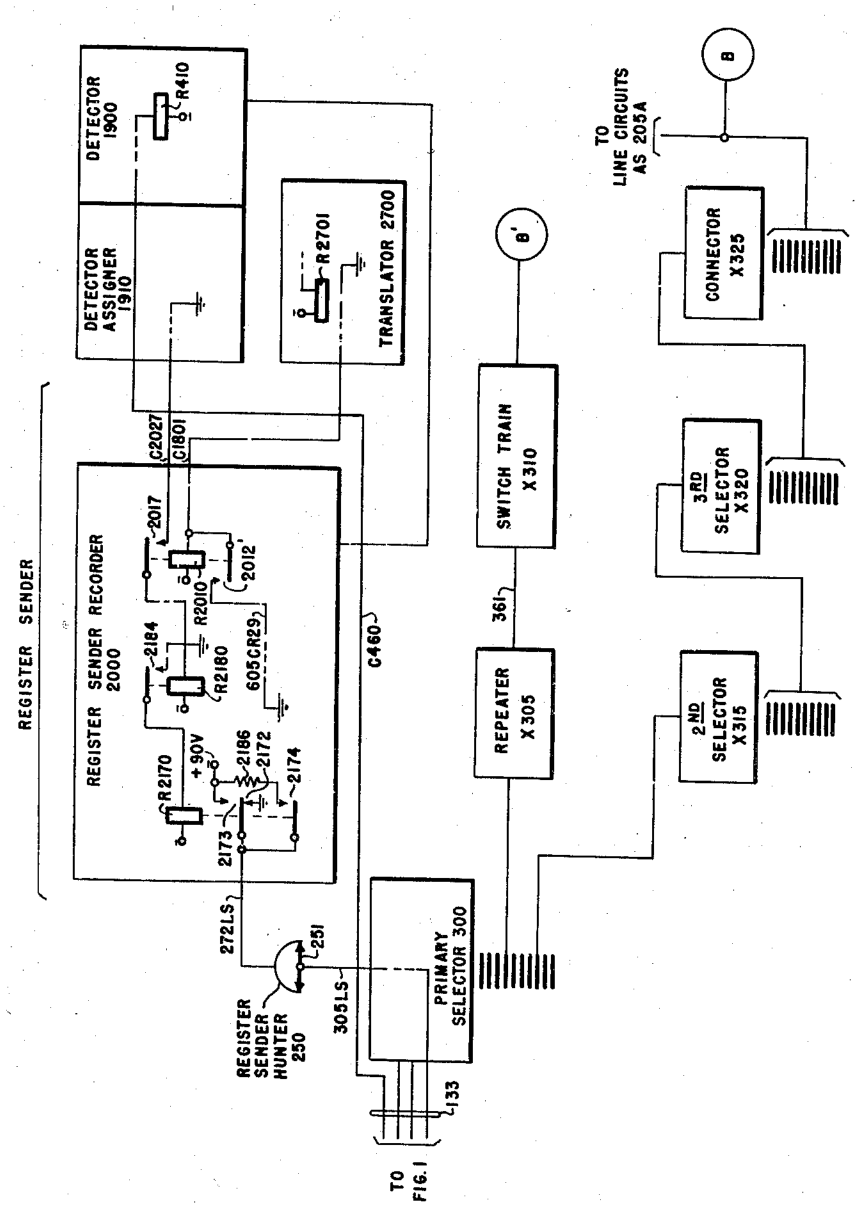

Additional objects of this invention relate to the circuit arrangement and operation for realizing the objects and features outlined above. This invention with respect to its organization and manner of operation together with its objects and features above listed will best be understood from the detailed description which follows when taken with reference to the accompanying drawings of which:

Figs. 1 and 2, together, illustrate a telephone system embodying the present invention, Fig. 1 showing a schematic representation of a linefinder circuit generally as described in the afore-mentioned patent to Bakker; associated apparatus including a distributor, metering means and the subscriber substation and line equipment have been symbolized by means of block diagrams since these are conventional components the details of which are not essential to the present disclosure, and Fig. 2 showing further by means of block diagrams sufficient of the components of an automatic telephone system of the character of that described in the aforementioned copending application of Coleman to fully describe the present invention. In each diagram sufficient elements of the circuits involved in the present invention are shown to adequately describe the manner of operation. It should be noted that in Fig. 2 and in Fig. 1, where necessary to facilitate comparison, the same reference characters used in the said copending Coleman application have been used to designate identical elements and components also appearing in that copending application.

In connection with a detailed description of the present invention reference may be had to the copending Coleman application for a more detailed description of the organization and manner of operation of collateral and associated equipment referred to and described only generally herein. In addition, in connection with reference to the detector apparatus herein, reference may be had to another copending application of Ivan V. Coleman, Serial No. 487,572, also filed February 11, 1955, for a more detailed description of this equipment.

Referring now more particularly to the drawings, the telephone system there represented comprises an exchange terminating a plurality of subscriber lines, including the line 101 which also terminates in the subscriber station A. Also included in the exchange is a plurality of linefinder-selector links including the link made up of the linefinder 240 and the primary selector 300 for setting up connections between the various subscriber lines. Each finder has access to 200 lines, these lines being arranged in a well-known manner to form two groups of 100 lines each. Each of the above described links, therefore, comprises a 200 point finder switch having access to each line in the system and a 100 point selector having access to trunks extending to additional selectors in the switch train. Moreover, the links described are arranged into two groups also in a well-known manner, with each of the group of links being provided with a distributor individual thereto for assigning idle ones of the links in the associated group for the use of calling ones of the lines.

More particularly, the first group of links includes the linefinder 240 and the primary selector 300 as aforementioned and is provided with a distributor and its associated group relays 242. The groups of subscriber lines with individually associated line circuits are associated with a distributor and group relays provided for that group. Thus, as is illustrated in Fig. 1, the subscriber station A and its line 101 through its line circuit 205A is connected to the distributor and group relays 242 common to the group of lines of which the line 101 is part. The line circuit 205A and the distributor 242 are of conventional construction and manner of operation and are fully described in the patent to Bakker referred to in the foregoing. Also associated with each line of each group of lines and individual thereto are subscriber meters A and B which may be of conventional design and operation and which meters are employed to register for each subscriber station, the number of local calls made to subscriber stations within the local exchange.

Continuing with a general description of the telephone system as illustrated in Figs. 1 and 2, a local switch train comprising the primary selector 300 referred to with a succeeding second selector X315, a third selector X320, and finally, a connector X325, provides means whereby a call may be extended from the subscriber station A to a local subscriber station B within the same exchange, both of which stations are provided with lines having appearances in the final connector, such as the connector X325. In addition, a toll switch train X310 is accessible through an impulse repeater X305 to the wipers of the primary selector 300 to extend calls originating at subscriber stations, such as the station A, to stations in distant exchanges, such as the subscriber station B′, and for which calls toll charges are to be assessed.

In connection with the latter cals, that is, toll calls to distant exchanges, register apparatus and its associated equipment performing translating and routing functions to control the primary selector 300 and the succeeding switch train is provided in the local exchange to extend a toll call to its desired terminus. In addition the register sender and detector apparatus controls associated equipment to identify a calling line and to make a permanent record of pertinent items of information relating to a toll call completed. A detailed description of the organization and manner of operation of the register sender and its associated equipment is found in the two copending applications of Coleman referred to previously. Shown in block diagram in Fig. 2 are certain of the components of the register sender and its associated equipment which include elements affecting the operation of the present invention and which have a direct bearing thereon. Thus is shown the register sender hunter 250 which connects the selector 300 to an idle register sender, the recorder 2000 portion of which also is shown. Cooperating with the register sender apparatus is a detector 1900, its assigner 1910, and a translator 2700.

The linefinder switch 240, shown substantially in detail in Fig. 1, comprises a switching mechanism of the 200 point Strowger type including a conventional contact bank and a row of contacts 150 arranged in vertical alignment. The Strowger mechanism additionally comprises well-known upper and lower wiper sets respectively including the wipers 121, 122, 123 and 124 and 125, 126, 127 and 128 and a control wiper 149 associated with the vertical row of contacts 150. The Strowger mechanism also includes a vertical magnet M170 for moving the said wipers in a vertical direction, a rotary magnet M171 for moving the said wipers in a rotary direction, and a release magnet M172 for releasing the said wipers and for causing their return to their normal positions. Associated with the Strowger mechanism are three sets of switch springs S175, S176, and S179 which are actuated by the movement of the said wipers from their normal position in a vertical direction, and a set of switch springs S174 which is actuated by the movement of the said wipers into an eleventh rotary position. It is further noted from Fig. 1 that the upper and lower wiper sets terminate respectively in conductors 131 and 132 which are operatively associated with the link conductors 133 extending between the finder switch 240 and the primary selector 300. The finder switch 240 further comprises a start relay R140, two wiper switching relays R150 and R160, a meter blocking relay R180, a metering relay R190, a supervisory lamp L128 and a manually operable busy switch S183. A start and level marking circuit 191 whose function and manner of operation is substantially similar to the circuit 191 shown and described in the afore-mentioned patent to Bakker also constitutes an element of the finder switch.

The selector switches 300, X315 and X320 also comprise conventional Strowger switching mechanisms of the 100 point type each having access to 100 trunks extending to succeeding switches of the switch train, the switches being connected and arranged in a conventional manner. The connector X325 also comprises a conventional Strowger mechanism for extending a calling line to a called subscriber line terminating on its contact banks under the control of dial pulses transmitted from the calling subscriber station. The connector X325 is provided with means well-known in the art for reversing the direction of the transmission current through the loop of the calling line when the called subscriber answers by removing the handset from its cradle. This last-mentioned means is not illustrated in the drawings. The reversing operation is important however, and will be referred to in the following description.

Also accessible to the wipers of the selector switch 300 by means of its bank contacts is switching apparatus including a repeater X305 and a switch train X310 for extending calls from subscriber stations in the local exchange, such as the station A, to subscriber stations in distant exchanges, such as the subscriber station B′, for which toll charges may be assessed.

Each of the distributors and associated respective group relays are connected and arranged in a manner similar to that of the distributor and group relays 242 which is associated with the "A" group of subscriber lines for purposes of this description. The distributor and group relays 242 are of conventional organization and manner of operation and here also only so much of the circuit elements are shown as are necessary to a full description of the present invention. Including among the elements of the distributor 242 is a rotary switch 241 having a pair of wipers individually associated with two banks of contacts, all of the remaining conductors extending from the linefinder switch 240 to the distributor 242 being common to all the linefinder switches in a group.

The present invention may best be understood from a detailed consideration of its operation in connection with the extension of calls from subscriber stations in the local exchange within which the improved linefinder switch of the present invention is also located to other subscriber stations. Since the operation of the present invention is concerned alone with the extension of calls between subscriber stations within said local exchange and calls from the latter subscriber stations to subscriber stations in distant exchanges for which toll charges are assessed only these two types of calls will be considered. A call to be extended from the subscriber station A shown in Fig. 1 to the subscriber station B of Fig. 2 is initiated at the station A in the conventional manner to energize a line relay, not shown, in the line circuit 205A. This line relay, in a well-known manner operates to ground the CN lead in order to mark the calling line busy on all the connector banks to which the CN lead is multipled. In addition, the line relay connects ground by way of the conductor C190 to the vertical bank contact of the bank 150 corresponding to the level associated with the calling line and also connects negative battery through the winding of the cut-off relay, also not shown, of the line circuit 205A to the C contact of the linefinder to mark the position of the calling line on the level associated with the calling line. The start and level marking circuit 191 being of well-known arrangement and operation is shown only symbolically in Fig. 1.

Application of ground potential by way of the conductor C190 to the vertical bank contact of the bank 150 as previously described also extends ground by way of the start conductor C110 to the distributor 242 thereby completing an energizing circuit for the start relay R131. When energized the start relay R131 operates to initiate the operation of the distributor 242, thereby to cause a preselected idle one of the linefinder-selector links to be assigned for the use of the calling subscriber line. It is to be understood that, in describing the operation of pertinent relays of the distributor 242, only those operations will be considered as are required for a minimal description of that apparatus.

When the relay R131 operates it completes, at its contacts 134, an energizing circuit for the relay R132. This latter relay operates and, at its contacts 135, applies ground to the finder start conductor C115 through the wiper and associated bank contact of the rotary switch 241, which conductor C115 extends to the linefinder circuit and negative battery therein through the start relay R140 of a preselected idle linefinder such as the linefinder 240 shown. Also incident to the operation of the relay R132 is the connection, by means of contacts not shown, of the stepping relay R133 to the interrupter conductor C114. The start relay R140 in the linefinder is energized by the previously stated application of ground to the circuit which may be traced from the contacts 135, through the wiper 105 of the rotary switch 241, the start conductor C115, the winding of the relay R140 to negative battery. The relay R140 operates and, at its contacts 145, completes an energizing circuit for the stepping relay R133 which may be traced from ground at the contacts 173, contacts 172, contacts 145, interrupter conductor C114, the winding of the relay R133, and negative battery. In addition, at its contacts 143 and 144, the relay R140 connects ground through the windings of the test relays R136 and R137, the test conductors 112 and C113, to the C wipers 127 and 123, respectively, of the linefinder switch 240. Also at its contacts 141 relay R140 prepares a point in an energizing circuit for the relay R138 and at its contacts 144′ prepares a point in an energizing circuit for the vertical magnet M170. At its contacts 149, the relay R140 prepares a point in a circuit for energizing the rotary magnet M171, and at its contacts 142, it connects negative battery to the positive line conductor C123 to operate a conventional line relay, not shown, in the primary selector 300. This battery extends through the upper resistance winding of the relay R160 and by means of the said operation of the selector line relay, not shown, preseizes the selector 300 in the conventional manner. The upper winding of the relay R160 is used only as a convenient expedient for providing a non-inductive protective resistance. The preseizure is accomplished in this manner, rather than by the well-known expedient of bridging the negative and positive conductors in the linefinder switch in order to provide a basis for distinguishing between this preseizure and the subsequent seizure of the selector 300 when the calling line has been seized by the linefinder switch. The associated register sender apparatus accomplishes a leakage test when this latter seizure is completed and the above arrangement is required to prevent this test at the preseizure stage of the selector 300 operation. Further, the relay R140, at its contacts 147 and 146, respectively, switches the upper winding of the wiper switching relay R150 from the control conductor C124 to the conductor C116 extending to the distributor 242; at its contacts 143, prepares a point in a circuit including the lower winding of the wiper switching relay R160; at its contacts 141′ interrupts a point in a possible energizing circuit for the motor magnet M173, which circuit extends from ground at the contacts 179 of the presently unoperated vertical off-normal switch S179; and, at its contacts 143′ and 142′, respectively, disconnects ground from the busy transfer relay R130 of the distributor 242 and connects ground by way of the conductor C128 to the control conductor C124 of the trunk line 133 in order to prepare the primary selector 300 for operation. The relay R130 is normally energized over circuits completed in idle ones of the linefinder switches of a group, such circuits extending from ground at the contacts 158 and 143′, contacts 184 of the busy switch S183, contacts 175′ of the vertical off normal switch S175, the all trunks busy conductor C121, intermediate contacts not shown, and the winding of the relay R130 to negative battery. The relay R130 is operated in a convenient manner with respect to the linefinder 240 to hold operated control circuits, not shown, in the distributor 242 which circuits insure that all of the linefinder switches in the group associated with the distributor 242 will be tested for busy or idle condition before the linefinder switches in the partner group are so tested.

The relay R133 when energized over the previously traced circuit, operates and, at its contacts 133′, completes an energizing circuit for the vertical stepping magnet M170 which circuit may be traced from ground at an operated contact not shown, and not here important, contacts 133′, contacts 138, contacts 140′, the vertical conductor C120, contacts 144′, and the windings of the vertical magnet M170 to negative battery. The magnet M170 now operates and is effective in a well-known manner to raise the wiper shaft of the Strowger mechanism 120 together with the wipers, including the vertical wiper 149, one step. Energizing of the magnet M170 also operates, at its contacts 173, to open the previously traced circuit for energizing the relay R133. As a result the relay R133 restores, thereby, at its contacts 133′, opening the previously traced energizing circuit for the vertical magnet M170. The magnet M170 restores again thereby closing the contacts 173 whereupon the relay R133 is again operated in the manner described to close the above-traced circuit for again energizing the vertical magnet M170. The above-described action continues until the vertical wiper 149 engages the contact of the vertical bank 150 marked by ground through the start and level marking circuit 191 by way of the conductor C190 from ground at the contacts of the operated line relay, not shown, of the line circuit 205A. When the vertical wiper 149 encounters ground, this ground is extended as described through a winding of the relay R138 by way of the contacts 141, contacts 139′, contacts 140′, conductor C120, contacts 144′, and the windings of the vertical magnet M170 to negative battery. The relay R138 operates in series with the vertical magnet M170 and at its contacts 138′, closes a a locking circuit for itself through the winding of the relay R139 and operated intermediate contact, not shown, to battery, and, at its contacts 138, opens a multiple ground to the vertical magnet M170. Relay R139 is energized over an obvious circuit and operates to close at its contacts 145′ a locking circuit for itself and, at its contacts 139′, interrupts a point in the energizing circuit for the relay R138 and the vertical magnet M170, both of which restore. The operation of the relay R139, at its contacts 140′ and 146′, respectively, also transfers the pulsing arrangement as controlled by the relay R133 from the vertical conductor C120 to the rotary conductor C118. When the vertical magnet M170 restores it again closes its contacts 173 thereby, as previously explained, again completing the energizing circuit for the relay R133 which now operates to prepare, at its contacts 133′ an energizing circuit for the rotary magnet M171. As soon as the wiper shaft is caused to be raised one step in the manner described the vertical off-normal switch S176 closes its contacts 176 to complete a circuit for the lower winding of the blocking relay R180 which may be traced as follows: ground at the contacts 158, contacts 142, contacts 176 and 193, and the lower winding of relay R180 to battery. The relay R180 will not operate at this time since it is a high voltage relay requiring more voltage for operation than supplied by the normal 58 volt exchange battery.

The energizing circuit for the rotary magnet M171 may be traced as follows: ground at contacts of group relays not shown, contacts 133′, contacts 138, contacts 146′, 134′ and 135′, rotary conductor C118, contacts 149, contacts 166, contacts 156, and the windings of the rotary magnet M171 to battery. The magnet M171 operates to rotate in a well-known manner the Strowger wiper mechanism 120 one step. The magnet 171 also operates, at its contacts 172, to open the previously traced energizing circuit for the interrupter relay R133. The relay R133 restores and, in a manner previously described, opens the energizing circuit for the rotary magnet M171. The relay R133 and the rotary magnet M171 cooperate in the manner described for the vertical motion of the wiper mechanism 120 to rotate the wipers of the linefinder switch step-by-step in a rotary direction until one of the control wipers 123 or 127 encounters a battery potential on a contact of the bank level being traversed. In the call under consideration, that is, a call originating in the A group of lines, the wiper 123 will encounter this battery potential which is extended through the winding of a cut-off relay, not shown, in the line circuit 205A, the wiper 123, contacts 144, conductor C113, a winding of the relay R137 and intermediate circuit elements, not shown, to ground.

The relay R137 operates and, at its contacts 136′ and 134′, respectively, opens the previously described circuit for the rotary magnet M171 and completes a point in an energizing circuit for the wiper switching relay R150. The magnet M171 now restores and, at its contacts 172, recompletes the energizing circuit, previously described, for the interrupter relay R133 which relay again operates to close its contacts 133′. The energizing circuit for the switching relay R150 may be traced as follows: ground at contacts not shown, contacts 133′, contacts 138, contacts 146′, contacts 136′, conductor C116, contacts 146, contacts 165, and the upper winding of the relay R150 to battery.

Relay R150 operates and connects, at its contacts 151′, contacts 151, and contacts 152, respectively, the meter conductor C127 to the wiper 124, and the negative and positive line conductors C122 and 123 extending from the selector 300 to the wipers 121 and 122. At its contacts 153, the relay R150 connects the control conductor C124 extending from the selector 300 to the wiper 123, and at its contacts 154 it prepares a point in a locking circuit for itself including the control conductor C124 extending to the selector 300. Also the relay R150 operates to open, at its contacts 155, a point in the energizing circuit for the companion switching relay R160, and at its contacts 156, the relay R150 interrupts a point in the previously traced energizing circuit for the rotary magnet M171. At the same time that contacts 151 and 152 of relay R150 close the loop circuit to the calling subscriber line thereby closing a circuit through the upper winding of the metering relay R190 to the line relay (not shown) of the selector 300, another circuit is closed at the contacts 157 by way of the contacts 183 for the lower winding of the relay R190. The metering relay R190, however does not operate at this time due to the fact that the current flowing through its upper winding through the loop circuit is in opposition to the current flowing in its lower winding through the previously described circuit.

When the loop of the calling telephone is extended from the linefinder switch 240 to the primary selector 300 the operating circuit of the conventional line relay, not shown, earlier completed from battery at the relay R160 as previously described, in the selector 300 is now completed from ground through the secondary winding of a dial tone transformer and intermediate contacts, not shown, out over the positive conductor C123 in the linefinder switch 240, and, in the usual manner, through conventional normally closed dial pulsing contacts of the calling telephone, not shown, and return via the negative conductor C122 and relay R190 to negative battery in selector 300. Dial tone is thus extended to the calling subscriber station and through the operation of the line relay, not shown, in the selector 300, ground is connected to the control conductor extending back to the linefinder switch 240 wherein, via the conductor C124, the ground is extended over the contacts 153 to the wiper 123 and thereby to the bank contact upon which the wiper 123 rests. This ground from the selector 300 extended through the winding of a cut-off relay, not shown, in the line circuit 205A, operates to open the circuit for the line relay, also not shown, of the line circuit 205A to battery. The cut-off relay, not shown, operates to open the circuit for the line relay, also not shown, of the line circuit 205A, which relay restores and in a conventional manner, removes ground from the start conductor C190 extending to the start and level marking circuit 191. Restoration of the line relay also operates to connect the conventional control normal conductor extending to banks of the connector to the control conductor over which ground is now being supplied to the winding of the afore-mentioned cut-off relay. Ground is, by this last mentioned expedient, extended to the connector bank to mark the calling line as busy thereon. The ground described as extending from the selector 300 via the conductor C124 is also extended through the contacts 154 to complete a locking circuit for the switching relay R150 thereby holding the linefinder switch 240 operated as long as this ground is supplied from the selector 300 or other switches in the switch train. In addition the afore-described ground from the selector 300 is extended by means of the operated vertical-off-normal switch S176 and its contacts 176 to the lower winding R180 to replace the ground removed therefrom by the opening of the contacts 158 through the operation of the switching relay R150. The switching-through operation of the linefinder switch 240 has now been completed and the distributor and group relays 242 are now ready to be operated to preselect another idle linefinder switch in a conventional manner. This operation as it relates to the operation of the present linefinder switch will be described hereinafter.

It should be here noted that if the call had originated from among the calling lines accessible to the other wiper set associated with the present linefinder switch 240 battery potential through a conventional cut-off relay would have been encountered by the wiper 127 as it was rotated step-by-step, which battery potential would have been extended through the contacts 143, the conductor C112, a winding of the relay R136 and intermediate circuit elements, not shown, to ground. The relay R136 instead of the relay R137 would operate and at its contacts 135′ and 137′ respectively, open the previously described circuit for the rotary magnet M171 and complete a point in an energizing circuit for the second wiper switching relay R160. The relay R160, energized over a circuit which may be traced from ground at contacts not shown, contacts 133′, 138, 146′, 134′, 137′, conductor C117, contacts 148, 155, and its winding to battery would then perform the previously described switching operation of the relay R150. In addition, at its contacts 168, the relay R160 would prepare a point in a circuit for the operation of the lower bank signal lamp L128, assuming that this subscriber line is associated with the lower bank of the Strowger linefinder switch 240.

In the event that two line relays in their respective line circuits, such as the line circuit 205A are operated, and in that event on the same rotary position of the wipers of the mechanism 120 both of the wipers 123 and 127 will encounter battery potential as previously explained. In this case both of the relays R136 and R137 will be operated. However, at its contacts 134′, the relay R137 will interrupt a point in the energizing circuit for the switching relay R160, and, at its contacts 136′, will close the energizing circuit for the switching relay R150 which relay and the line in the bank with which the relay R150 is associated will therefore take preference in switching.

When the ground is removed from the start conductor C190 at the contacts of the line relay, not shown, as previously described, the original energizing circuit for the relay R131 will be opened. If no other call has been originated in the group of lines with which the distributor 242 is associated the relay R131 will restore.

It should be explained at this point that when either of the switching relays R150 or R160 has operated its contacts 157 or 167, respectively, ground will be closed over the conductor C119 to the motor magnet M173 when relay R132 restores in the manner described in the Bakker patent. The relay R132 will restore and effect among other operations at its contacts 135, the opening of the circuit for the start relay R140 of the linefinder 240. The relay R140 restores and, at its contacts 142 removes negative battery from the positive line conductor C123 thereby permitting the aforementioned leak test of the register sender to be performed over the completed subscriber line loop circuit. At its contacts 141′, relay R140 connects a multiple ground through the operated off-normal contacts 179 to the guard conductor C119 and opens all of the previously described control circuits extending between the linefinder switch 240 and the distributor and group relays 242.

When the switching through operation has been accomplished, in this description by the switching relay R150, and ground at its contacts 157 has been extended through the guard conductor C119 to the motor magnet M173 and the relay R132 has restored, the latter magnet operates and opens its own circuit at interrupter springs, not shown, whereupon it restores and thereby advances the rotary switch 241 one step in a conventional manner. The wipers 105 and 106 are thus advanced to the bank contacts associated with the next linefinder switch similar to the switch 240. The guard conductor, such as the conductor C119, of the next linefinder will now be connected through the wiper 106 to the motor magnet M173 through its now closed interrupter springs, not shown. If the next linefinder is busy the wiper 106 will encounter ground supplied thereto through a conductor, such as conductor C119, from a contact of a switching relay, such as the contact 157 or 167. The motor magnet M173 will again be operated and at the same time the relay R132 will be short circuited over a circuit not shown, to prevent its operation should the relay R131 be operated as the result of another call being attempted before the distributor 242 has found another idle linefinder switch. This operation of the motor magnet M173 will be continued in a well-known manner until the wiper 106 encounters an absence of ground.

When the primary selector 300 of the linefinder-selector link of which the linefinder switch 240 is part, is seized, a number of operations take place in the selector 300 preparatory to its operation under the control of the first series of digital pulses as transmitted from the calling subscriber station or the control of the register sender associated with the selector 300 in the local exchange. These operations are fully described in the afore-mentioned copending application of Coleman, Serial No. 487,500 and need not be repeated here. As a result of these operations the control conductor C124 is extended through the primary selector 300 of Fig. 2 to the conductor 305LS. Holding control of the linefinder switch 240 and the line circuit 205A is further extended by means of the wiper 251 of the register sender hunter 250 to the conductor 272LS whereby it is introduced into the recorder 2000 portion of the register sender. At this point a multiple holding ground is returned from the break contacts 2172 of the relay R2170 to the windings of the relays R150 (or R160) and the lower winding of the relay R180. As the result of the above-mentioned operations of the selector 300, holding ground originally supplied there is removed.

When the calling subscriber at the local exchange hears the dial tone extended from the primary selector 300 the conventional operation of dialing the called local subscriber station B directory number may be performed and, under the control of the dialed digital impulses transmitted over the line loop circuit, the call is extended over the switch train in a well-known manner. It should be here noted that, in the case of a local call, upon the dialing of the first three digits representing the called office code, the register sender equipment will operate in response to the registration of the first three digits to release the register sender from the primary selector 300 in the manner fully described in the copending application of Coleman, Serial No. 487,500. When the called subscriber at the called subscriber station B answers by removing the handset from its cradle the well-known operation of the connector X325 accomplishes the also well-known function of reversing the battery potential to the line loop circuit thereby reversing the direction of the current flow in the line loop circuit. The metering relay R190, the upper winding of which is series connected with the negative line conductor C122, is now operated due to the fact that the current flow in the upper and lower winding thereof is now producing a cooperating rather than, as previous to the current reversal, an opposing flux. At its contacts 191, the relay R190 completes an energizing circuit for a subscriber meter, such as the subscriber meter A, individually associated with each subscriber line. The subscriber meter as here employed is of conventional manufacture and is adapted to electromagnetically operate to register each time a call is completed from a subscriber station within the local exchange to another subscriber within the same local exchange. The above-mentioned circuit may be traced from ground at the subscriber meter A, since the call is originating at the subscriber station A, conductor C191, wiper 124, contacts 151', conductor C127, contacts 191, conductor C126, and the lower resistance winding of the relay R150 to negative battery. The subscriber meter A now operates to register the completion of the connection to the called subscriber station. At its contacts 193, the metering relay R190 interrupts a point in the energizing circuit for the relay R180 the operation of which will not at this time be required. Up to this point it was necessary that relay R180 be in readiness to disable the metering arrangement in a manner subsequently to be described should another means of registering the call be required. Also at its contacts 192, the relay R190 operates to provide a by-passing circuit for its upper winding, which winding is in series with the line conductor C122, to prevent any interference with message transmission on the line since the metering potential will be applied for the duration of the call.

Before the release of the linefinder switch 240 at the termination of a call is described, the completion of a connection extended by means of the toll switch train to a subscriber station B' will first be considered. When after the dialing of the office code portion of the called subscriber station directory number the register sender has determined that the call in progress is to be one for which toll charges are to be assessed, a number of operations are initiated in the register sender and its associated equipment. These operations are fully described in the afore-mentioned copending applications of Coleman and only those operations and system components relating immediately to the operation of the linefinder switch of this invention will be here considered. It is sufficient to note that the registration in the register sender equipment of the first three digits of a toll code will automatically effect the association of a translator 2700 with the register sender so that a translation of the registered code comprising a plurality of routing digits will be registered in a route register, not shown, in a coder portion, also not shown, of the register sender. These routing digits will be employed by the register sender to route the call by way of the primary selector 300 in the appropriate direction and the register sender by means not shown, will thereafter transmit whatever digits registered by the calling subscriber that are necessary to complete the connection over the repeater X305, and the toll switch train X310 to the called subscriber station B'. The translator 2700 is only called into use when the register sender equipment has ascertained that a translation is required and also functions with the register sender with which it is associated to apprise the call recorder 2000 portion of the register sender equipment that the particular call for which translation was required is a toll call which is to be recorded and, consequently, requires the use of a detector 1900 to ascertain the directory number of the particular calling station involved in the telephone connection.

The detector 1900 is connected by identifying conductors in the cable C460 to each of the connector bank terminals of each of the subscriber stations in the exchange and it is associated with the call recorder 2000 portion of a calling register sender equipment by means of a detector assigner 1910 as shown in Fig. 2. In an actual installation as many as 200 different register senders may be individually associated with a common detector 1900 by means of the apparatus, not shown, provided in the detector assigner 1910.

The translator 2700, in determining whether or not the services of the detector 1900 is to be required, operates, if the termination is positive, by means of a circuit not shown, the translate relay R2701. The latter relay operates at one of its multiple contacts to extend ground through intermediate components not shown, the conductor C1801, to the AB toll relay R2010 in the recorder 2000 portion of the register sender. The relay R2010 operates, at its contacts 2012', to lock itself to ground over a circuit only the conductor 605CR29 of which is shown, so that the relay R2010 will remain in its operated position until the associated register sender is restored to normal. As a further result of the operation of the relay R2010, at its contacts 2017, it simultaneously applies resistance battery through the winding of the marginal detector test relay R2180 to the conductor C2027 extending to the detector assigner 1910. When the detector assigner 1910 has determined that the detector 1900 is available to be associated with the register sender various operations not here important are completed to effect this connection. Among its operations the detector assigner 1910 connects ground by means not shown to the conductor C2027 to the recorder 2000 and the relay R2180 over the circuit previously partially described.

The test relay R2180 is energized and among its operation, at its contacts 2184, it completes an energizing circuit for the relay R2170. When the relay R2170 operates, it applies, at its contacts 2174, a positive 90 volt battery potential to the conductor 272LS through a resistor 2186 while at the same time, at its contacts 2172, the relay R2170 removes ground potential from the conductor 272LS. An instant later, the relay R2170 applies, at its contacts 2173, the positive volt battery potential directly to the conductor 272LS. The contacts 2174 are provided to insert the resistor 2186 in the circuit during the transition period between the opening of the contacts 2172 and the closing of the contacts 2173. At this point it should be noted that the direct holding ground originating at the contacts 2172 and extended over a circuit previously described to battery through the winding of the relay R150 to thereby hold the linefinder switch 240 and the line circuit 205A operated for the duration of the call is also applied by way of contacts 153, wiper 123 and through line circuit 205A to the CN conductor and then by way of the conductor C460 to the detector 1900 and the winding of a relay R410 to battery. The exchange battery potential at this time is insufficient to operate this latter relay, however.

When the relay R2170 effects the substitution, at its contacts 2173, of the 90 volt positive battery potential for the direct ground potential, the relay R410 will have sufficient potential applied thereto as described in the copending application of Coleman, Serial No. 487,572, to initiate the operation of the detection function. The 90 volt positive battery potential will also be extended by way of contacts 2173, conductor 272LS, wiper 251, conductor 305LS, conductor C124, contacts 176 and 193 through the lower winding of the blocking relay R180 to negative battery. With the addition of the 90 volt battery potential to the regular exchange battery potential the relay R180 now operates and, at its contacts 181, completes a by-pass circuit shunting the upper winding of the metering relay R190 and at the same time, at its contacts 183, opens the circuit through the lower winding of the relay R190. The operation of the metering relay R190 is in this manner effectively blocked as long as either of the contacts 181 or 183 is held operated and no operation of the subscriber meter controlled at the contacts 191 of the relay R190 can be effected when the line loop battery reversal is accomplished when the subscriber station B' answers. As a further result of the operation of the blocking relay R180 it completes a locking circuit for itself through its upper winding which circuit may be traced from ground at the contacts 157, contacts 182, and the upper winding of the relay R180 to negative battery.

When the detection and identifying operation has been completed by the detector 1900 the energizing circuit for the relay R2170 will be opened by means not shown. When the latter relay restores, the direct ground potential will again be applied to the conductor 272LS to replace the positive 90 volt battery potential, through the restoration of the contacts 2172 and 2173, respectively. The relay R410 in the detector 1900 will restore to normal and effect the restoration of the detector 1900.

When the call to subscriber stations within the local exchange or in exchanges for which toll charges are assessed, the completion of the connections for which was described above, are terminated the replacing of the hand-set at either the calling or the called subscriber station will open the line loop circuit and initiate a series of conventional operations eventually resulting in the restoration of the primary selector 300. When this occurs, the circuit is broken which extends in the well known manner from ground in selector 300, and ground potential is removed from the control conductor C124 thereby removing the busying ground from the connector terminals. The energizing circuit for the switching relay R150 and the circuit through the lower winding of relay R180 are thereby opened, and relay R150 thereupon restores. At the same time the energizing circuit for the cut-off relay, not shown, in the line circuit 205A is also opened which relay also restores. When the switching relay R150 restores, it opens, at its contacts 151', a point in the energizing circuit for the subscriber meter A, at its contacts 151 and 152, respectively, the line loop circuit, at its contacts 153, a connection between the control conductor C124 and wiper 123, at contacts 157 the locking circuit of relay R180, and, at its contacts 154, its own operating circuit. In addition, restoration of the relay R150, completes, at its contacts 158, an energizing circuit for the release magnet M172. This latter circuit may be traced from ground at the contacts 158, contacts 143', contacts 184, vertical off-normal contacts 175, contacts 169, and the winding of the magnet M172 to battery.

Restoration of the cut-off relay, not shown, in the line circuit 205A, reconnects the line relay, also not shown, to the subscriber line. The release magnet M172 operates and in a well-known manner restores the shaft and wipers of the Strowger mechanism 120 to their normal positions. When the Strowger mechanism 120 is restored to its normal vertical position the vertical off-normal switches S175, S176, and S179 are restored to normal thereby to open at the contacts 175, the circuit for the release magnet M172 which magnet restores, and, at its contacts 175', close ground to the busy transfer relay R130 over a circuit which may be traced as follows: ground at the contacts 158, contacts 143', contacts 184, contacts 175', all trunks busy conductor C171, a pair of contacts in the distributor and group relays 242, not shown, and the winding of the relay R130 to battery. Finally, the restoration of the vertical off-normal switch S179 removes, at its contacts 179, ground from the guard conductor C119 thereby marking the linefinder switch 240 as idle to the distributor and associated group relays 242.

Returning to the restoration of the vertical off-normal switch S176—when the contacts 176 are opened one of the energizing circuits for the blocking relay R180 is opened through its lower winding. This latter circuit will, however, already have been deenergized at the time the primary selector 300 is restored and ground is removed from the control conductor C124. Thus if the call, the release of the linefinder after the termination of which is being described, was one completed to a subscriber station for which toll charges were assessed, the relay R180 will restore and, at its contacts 182, open its locking circuit through its upper winding and, at its contacts 183, prepares a point in a previously described energizing circuit for the metering relay R190. Further, at its contacts 181, restoration of the relay R180 will open the by-pass circuit shunting the metering relay R190.

If the release of the linefinder switch 240 is being accomplished upon the termination of a call to a subscriber station within the local exchange and which call was registered by the subscriber meter A, the metering relay R190 will be deenergized when the contacts 157 are restored to normal upon the restoration of the switching relay R150 and thus remove ground from the circuit to battery through the lower winding of the relay R190. The latter relay will restore and, at its contacts 192, open the by-pass circuit shunting its upper winding and, at its contacts 193, prepare a point in an energizing circuit for the blocking relay R180. The linefinder switch 240 will now be restored to normal and will again be available to search for a calling line as assigned by the distributor and its associated group relays 242.

While what has been described is considered to be the preferred embodiment and application of the present invention, it is to be understood that modifications may be made in the organization and arrangement of the circuit elements and components without departing from the true spirit and scope of the present invention as defined in the appendent claims.

What is claimed is:

1. In a telephone system, a local exchange, calling subscriber lines in said local exchange, called subscriber lines in said local exchange, first switching apparatus in said local exchange for completing connections between a calling and a called subscriber line in said local exchange, a plurality of registering means individual to each of said calling subscriber lines for registering calls, means for operating said registering means, said operating means operated responsive to the completion of calls between said calling and said called subscriber lines in said local exchange, other exchanges, called subscriber lines in said other exchanges, second switching apparatus for completing connections between a calling subscriber line in said local exchange and a called subscriber line in one of said other exchanges, means associated with said first and said second switching apparatus for determining whether said calls are to be completed in said local exchange or in one of said other exchanges, and means for disabling said operating means to thereby prevent operation of said registering means responsive to the determination by said determining means that said call is to be completed in one of said other exchanges.

2. In a telephone system, a local exchange, calling subscriber lines in said local exchange, called subscriber lines in said local exchange, first switching means for completing connections between a calling and a called subscriber line in said local exchange, other exchanges, called subscriber lines in said other exchanges, second switching means for completing connections between a calling line in said local exchange and a called line in one of said other exchanges, a first and a second call registering means, discriminating means associated with said first and said second switching means for distinguishing between calls to subscriber lines in said local exchange and calls to subscriber lines in one of said other exchanges, means for operating said first registering means, said operating means operated responsive to the completion of a call to a subscriber line in said local exchange to register said call, and means for disabling said operating means, said disabling means and said second call registering means operated responsive to the determination by said discriminating means that a call is to be completed to a subscriber line in one of said other exchanges to respectively disable said operating means and thereby prevent operation of said first call registering means and to register said call to said subscriber line in one of said other exchanges on said second call registering means.

3. In a telephone system, a local exchange, calling subscriber lines and called subscriber lines in said local exchange, first switching means including a first selector for establishing connections between said calling subscriber lines and called subscriber lines in said local exchange, registering means individually associated with each of said calling subscriber lines, means for operating said registering means, said operating means operated responsive to the completion of a call to a subscriber line in said local exchange to thereby operate said registering means and register said call, other exchanges, called subscriber lines in said other exchanges, second switching means also including said first selector for establishing connections between said calling subscriber lines and called subscriber lines in said other exchanges, a register sender associated with said first selector for controlling said first selector and said second switching means, detecting means associated with said register sender for detecting and identifying said calling subscriber lines, means associated with said register sender for distinguishing between calls to subscriber lines in said local exchange and calls to subscriber lines in one of said other exchanges, means for disabling said operating means, and means operated responsive to said distinguishing means determining that a call is to be completed in one of said other exchanges for energizing said detecting means and said disabling means whereby respectively said calling line is detected and identified and said registering means is prevented from operating.

4. In a telephone system, a local exchange, other exchanges, a calling subscriber line in said local exchange, called subscriber lines in said local exchange and in said other exchanges, switching apparatus for establishing connections between said calling subscriber line and said called subscriber lines, registering means individually associated with said calling subscriber line, means for operating said registering means, said operating means normally operated responsive to the completion of a call to one of said subscriber lines to register said call, means associated with said switching means for distinguishing between calls to subscriber lines in said local exchange and calls to subscriber lines in said other exchanges, detecting means associated with said switching means, and means for disabling said operating means, said detecting means and said disabling means operated responsive to the determination by said distinguishing means that said call is to be completed to called subscriber lines in said other exchanges to respectively detect and identify said calling line and disable said operating means to thereby prevent the operation of said registering means.

5. In a telephone system, a local exchange, other exchanges, a calling subscriber line in said local exchange, a called subscriber line in said local exchange and a called subscriber line in one of said other exchanges, switching apparatus for establishing a connection between said calling subscriber line and said called subscriber line in said local exchange, second switching means for establishing a connection between said calling subscriber line and said called subscriber line in the said one of said other exchanges, registering means individually associated with said calling line, means for operating said registering means, said operating means normally responsive to the answering of a call on one of said called subscriber lines to thereby operate said registering means and register said call, means for determining a call to be established to said called subscriber line in one of said other exchanges, means for preventing the operation of said operating means, said preventing means operated responsive to the determination by said determining means that a call to be established is one to a called subscriber line in one of said other exchanges to thereby prevent said operating means from operating whereby said registering of said call is prevented.

6. In a telephone system, a local exchange, other exchanges, a calling subscriber line in said local exchange, a called subscriber line in said local exchange and a called subscriber line in one of said other exchanges, switching apparatus including a linefinder for establishing a connection between said calling subscriber line and one of said called subscriber lines, registering means individually associated with said calling subscriber line for registering a call, operating means in said linefinder for operating said registering means, said operating means normally operated responsive to the answering of a call on one of said called subscriber lines, disabling means in said linefinder for disabling said operating means, means associated with said switching apparatus for distinguishing between connections to be established to said called subscriber line in said local exchange and connections to be established to said called subscriber line in the said one of said other exchanges, said disabling means operated responsive to the determination by said distinguishing means that a connection to be established is one to said called subscriber line in the said one of said other exchanges, to thereby disable said operating means whereby the operation of said registering means is prevented.

7. In a telephone system, a local exchange, a plurality of subscriber lines including a calling subscriber line in said local exchange, other exchanges, a plurality of subscriber lines in said other exchanges, a linefinder switch having access to said plurality of subscriber lines in said local exchange, a plurality of registering means individually associated with said plurality of subscriber lines in said local exchange, means operated responsive to the initiation of a call on said calling subscriber line for connecting said linefinder switch with said calling subscriber line, first additional switching apparatus for extending a connection between said calling subscriber line and a called one of said plurality of subscriber lines in said local exchange, second additional switching apparatus for extending a connection between said calling subscriber line and a called one of said plurality of subscriber lines in said other exchanges, means associated with said first and said second switching apparatus for distinguishing between a connection to be established to a called subscriber line in said local exchange and a connection to be established to a called subscriber line in said other exchanges, means in said linefinder switch for operating the one of said registering means associated with said calling subscriber line, said operating means energized responsive to the answering of a call on said called one of said plurality of subscriber lines in said local exchange for registering said call, detecting means associated with said first and said second switching apparatus for detecting and identifying said calling line, disabling means in said linefinder switch for disabling said operating means, said detecting means and said disabling means operated responsive to said distinguishing means determining a connection to be established as one to a called subscriber line in said other exchanges to respectively detect and identify said calling subscriber line and to operate said disabling means whereby said energizing of said operating means and thereby said operation of said registering means is prevented.

8. In a telephone system, a local exchange, a calling subscriber line in said local exchange, other exchanges, a called subscriber line in said local exchange and a called subscriber line in one of said other exchanges, a linefinder switch operable responsive to the initiation of a call on said calling subscriber line for finding said calling subscriber line, a first switching apparatus including said linefinder switch for establishing a connection between said calling subscriber line and said called subscriber line in said local exchange, a second switching apparatus also including said linefinder switch for establishing a connection between said calling subscriber line and said called subscriber line in said one of said other exchanges, metering means individual to said calling subscriber line, means in said linefinder switch for operating said metering means, said operating means normally energized responsive to the answering of a call on said called subscriber line in said local exchange to thereby meter said call, detecting means associated with said first and said second switching apparatus for detecting and identifying said calling subscriber line, disabling means for disabling said operating means, a source of potential for energizing said detecting means and said disabling means, and means for connecting said source of potential to said detecting means and said disabling means when said connection to be established is to said called subscriber line in the said one of said other exchanges, to thereby energize said detecting means and said disabling means, whereby said calling subscriber line is respectively detected and identified and said operating means is disabled whereby metering of said call on said subscriber line in the said one of said other exchanges is prevented.

9. In a telephone system, a local exchange, other exchanges, a calling subscriber line in said local exchange, a called subscriber line in said local exchange and a called subscriber line in one of said other exchanges, switching apparatus including a linefinder switch for extending connections between said calling subscriber line and said called subscriber lines, metering means individually associated with said calling subscriber line, an energizing circuit for said metering means, first relay means in said linefinder switch for controlling said energizing circuit, a preenergizing circuit for said first relay means, an operating energizing circuit for said first relay means including said switching apparatus, said operating energizing circuit completed when a call is answered on said called subscriber line in said local exchange, said preenergizing circuit and said operating energizing circuit cooperating to operate said first relay means to control said metering means energizing circuit to thereby operate said metering means whereby said call is metered, second relay means in said linefinder switch for disabling one of said energizing circuits of said first relay means, an operating circuit for said second relay means, a source of potential, and means for connecting said source of potential to said last-mentioned operating circuit when a connection is to be extended to said called subscriber line in said one of said other exchanges to thereby energize said second relay means whereby said one of said energizing circuits for said first means is disabled to thereby disable said energizing circuit for said metering means.

10. In a telephone system as claimed in claim 9, in which said second relay means is operable to disable both of said energizing circuits for said first relay means to thereby disable said energizing circuit for said metering means.

11. In a telephone system, a local exchange, calling subscriber lines in said local exchange, other exchanges, called subscriber lines in said local exchange and called subscriber lines in said other exchanges, subscriber meters individually associated with said calling subscriber lines, switching apparatus including a linefinder switch for extending a connection between a calling subscriber line and a called subscriber line, means controlled responsive to the initiation of a call on one of said calling subscriber lines for connecting said linefinder switch to said calling subscriber line and its associated subscriber meter, first circuit means for energizing said subscriber meter extending to said linefinder switch, a first relay means in said linefinder switch for controlling said first circuit means to thereby energize said subscriber meter, a preenergizing circuit for said first relay means energized when said linefinder switch is connected to said calling subscriber line, an operating energizing circuit for said first relay means including said switching apparatus, said operating energizing circuit energized upon the answering of a call on a called subscriber line in said local exchange, energizing of both said preenergizing circuit and said operating energizing circuit cooperating to operate said first relay means to control said first circuit means whereby said subscriber meter is energized to meter the said call to said called subscriber line in said local exchange, a second relay means in said linefinder switch for disabling said preenergizing circuit and said operating energizing circuit for said first relay means, and a second circuit means for operating said second relay means, said second circuit means energized responsive to the initiation of a call on said calling subscriber line to one of said subscriber lines in one of said other exchanges to disable both of said energizing circuits for said first relay means to thereby control said first circuit means whereby the energizing of said subscriber meter is prevented.

12. In a telephone system, a local exchange, a calling subscriber line in said local exchange, other exchanges, a called subscriber line in said local exchange and a called subscriber line in one of said other exchanges, a call register individual to said calling line, a linefinder switch, means operated responsive to the initiation of a call on said calling subscriber line for connecting said linefinder switch to said calling subscriber line and said associated call register, a first circuit means for energizing said call register extending to said linefinder switch, a first switching apparatus including said linefinder switch for extending a connection to said called subscriber line in said local exchange, a second switching apparatus also including said linefinder switch for extending a connection to said called subscriber line in the said one of said other exchanges, a first relay in said linefinder switch for controlling said first circuit means, said first relay having a first energizing winding in said line extended to a called subscriber line, and a second energizing winding, a circuit including said second energizing winding energized responsive to said connection of said linefinder switch to said calling line, said first energizing winding normally energized over said line responsive to the answering of a call on a called subscriber line, said energizing of said first winding and said energizing of said second winding cooperating to operate said first relay to control said first circuit means whereby said call register is energized to register said call to said called subscriber, a second relay in said linefinder switch, said second relay operable to disable said energizing circuits of said first relay, a second circuit means for energizing said second relay, means associated with said first and said second switching apparatus for determining calls to be extended to said subscriber line in said one of said other exchanges, detecting means associated with said first and said second switching apparatus for detecting and identifying said calling subscriber line, an energizing potential, and means for connecting said energizing potential to said second circuit means and to said detecting means responsive to said determination that a call is to be extended to said called subscriber line in the said one of said other exchanges, said second circuit means energized thereby to operate said second relay to disable said energizing circuits of said first relay to thereby prevent said energizing of said call register, and said detecting means energizing thereby to detect and identify said calling subscriber line.

13. In a telephone system having a calling subscriber line and a plurality of called subscriber lines, means for establishing connections between said calling subscriber line and one of said called subscriber lines, metering means for metering calls on connections established to predetermined ones of said called subscriber lines, registering means for registering calls on connections established to predetermined others of said called subscriber lines, means for distinguishing between connections to be established to particular ones of said called subscriber lines, means for operating said metering means responsive to the establishing of a connection to said predetermined ones of said called subscriber lines, means for disabling said operating means, said registering means and said disabling mean operated responsive to the determination by said distinguishing means that a connection to be established is to one of said predetermined others of said called subscriber lines to operate said registering means and to operate said disabling means whereby said metering means is prevented from operating.

14. A call metering arrangement for an automatic telephone system comprising a subscriber meter individually associated with a calling subscriber line, a linefinder switch operable upon the initiation of a call on said calling subscriber line to connect to said calling subscriber line and said subscriber meter, means in said linefinder switch for normally operating said subscriber meter responsive to the answering of a call at a called terminus, and means in said linefinder switch for disabling said operating means and thereby preventing the operation of said subscriber meter upon the initiation of a call to predetermined called termini.

15. A call detection and metering arrangement for an automatic telephone system comprising a subscriber meter individually associated with a calling subscriber line, a linefinder switch operable upon the initiation of a call on said calling subscriber line to connect to said calling subscriber line and said subscriber meter, means in said linefinder switch for normally operating said subscriber meter responsive to the answering of a call at one called terminus, detecting means for detecting and identifying said calling subscriber line, disabling means in said linefinder switch for disabling said subscriber meter operating means, and means for operating said disabling means and said detecting means responsive to the initiation of a call to a predetermined called terminus.

16. In a telephone system, a local exchange, subscriber lines terminating in said local exchange, a meter individual to each of said lines, means for completing local calls between a calling subscriber line and a called line in said local exchange, means for operating the calling subscriber's individual meter in response to the called local subscriber answering, other exchanges, called subscriber lines in said other exchanges, means for initiating a toll call by a calling subscriber line in said local exchange dialing the digits of a called subscriber line in one of said exchanges, call register means for registering the calling local subscriber telephone number, and means responsive to said toll call for disabling said meter operating means and for operating said call register means to register the line number of said calling local subscriber for the purpose of assessing toll charges.

17. In a telephone system, a calling line, means controlled by said calling line for extending local connections and for extending toll connections, a meter individual to said calling line, means for operating said meter to register local completed connections, means for applying a special operating potential to said calling line only in case said calling line is extending a toll connection, register means for registering the telephone line number of said calling line for toll ticketing purposes in response to said application of said special operating potential to said calling line, and meter blocking means also operated responsive to said application of said special operating potential for disabling said meter operating means to thereby prevent operation of the calling subscriber's meter on toll calls.

18. In a telephone system, local subscriber lines, a meter individual to each of said local lines, distant subscriber lines, means controlled over calling ones of said local subscriber lines for extending local connections between said local subscriber lines and for extending toll connections from calling ones of said local subscriber lines to said distant subscriber lines, an answer relay, an operating circuit and an operating winding of said answer relay included in said local and toll extended connections, means for operating said answer relay over its operating winding and said operating circuit on completed local connections between said local subscriber lines in response to the called local subscriber answering, a metering circuit closed by the operation of said answer relay for operating the calling subscriber's meter to register said local call, a meter blocking relay, means for operating said meter blocking relay on toll connections extended from said local subscriber lines to said distant subscriber lines, and contacts closed by the operation of said blocking relay for shunting said operating winding of said answer relay to prevent the operation of said answer relay to thereby prevent the operation of the calling subscriber's meter on complted toll connections.

19. In a telephone system, a local exchange, local subscriber lines terminating in said local exchange, other exchanges, called subscriber lines terminating in said other exchanges, means for completing local calls from a local calling subscriber line to local called subscriber lines and for completing toll calls from said local calling line to said called lines in said other exchanges, a first register means individual to each local subscriber line for registering local calls between local subscriber lines in said local exchange, a second register means common to all said local subscriber lines for registering toll data on toll calls between local calling subscriber lines and said called lines of said other exchanges, means for operating said first register means individual to said calling local subscriber line in response to the called local subscriber answering a local call, and means effective during the establishment of a toll call from said local calling subscriber line to a called subscriber line in one of said other exchanges for disabling said operating means of said first register means and for operating said common second register means to register charge assessing toll data for said toll call.

20. In a telephone system, a calling line, a subscriber station on said line having a particular directory number, means controlled from said station on said calling line for extending local connections and toll connections, a message register individual to said calling station, means for operating said message register to register completed local connections from said calling station, a source of identifying potential, means controlled in response to the extension of a toll connection for applying said identifying potential to said calling line, means responsive to said application of said identifying potential for identitfying the directory number of said calling station on said calling line, register means for registering said identified directory number of said calling station on said calling line for the purpose of making a permanent record of said call, and message register blocking means also operated in response to said application of said identifying potential to said calling line for disabling said message register operating means in order to prevent said register from operating in connection with the extension of said toll call.

References Cited in the file of this patent

UNITED STATES PATENTS

| | | |
|---|---|---|
| 2,165,924 | Goodrum | July 11, 1939 |
| 2,369,071 | Ostline | Feb. 6, 1945 |